(12) United States Patent
Lamponi et al.

(10) Patent No.: US 10,578,806 B2
(45) Date of Patent: Mar. 3, 2020

(54) OPTICAL CHIP AND METHOD FOR COUPLING LIGHT

(71) Applicant: Huawei Technologies Co., Ltd., Shenzhen (CN)

(72) Inventors: Marco Lamponi, Ghent (BE); Martijn Tassaert, Ghent (BE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/449,730

(22) Filed: Jun. 24, 2019

(65) Prior Publication Data

US 2019/0310424 A1    Oct. 10, 2019

Related U.S. Application Data

(63) Continuation of application No. PCT/CN2017/118149, filed on Dec. 23, 2017.

(30) Foreign Application Priority Data

Dec. 23, 2016    (EP) .................................... 16206810

(51) Int. Cl.
    *G02B 6/30* (2006.01)
    *H04J 14/04* (2006.01)
    (Continued)

(52) U.S. Cl.
    CPC ......... *G02B 6/305* (2013.01); *G02B 6/12004* (2013.01); *H04J 14/04* (2013.01); *H04J 14/06* (2013.01)

(58) Field of Classification Search
    None
    See application file for complete search history.

(56) References Cited

U.S. PATENT DOCUMENTS

| 7,865,080 B2 * | 1/2011 | Hecker | ................... | H04J 14/06 |
| | | | | 398/152 |
| 8,073,338 B2 * | 12/2011 | Buelow | ................ | H04B 10/505 |
| | | | | 398/184 |

(Continued)

FOREIGN PATENT DOCUMENTS

| CN | 101231369 A | 7/2008 |
| CN | 102736181 A | 10/2012 |

(Continued)

OTHER PUBLICATIONS

Machine Translation and Abstract of Chinese Publication No. CN101231369, Jul. 30, 2008, 10 pages.

(Continued)

*Primary Examiner* — Rhonda S Peace
(74) *Attorney, Agent, or Firm* — Conley Rose, P.C.

(57) ABSTRACT

An optical chip comprises an input edge coupler having at least one input waveguide and configured to receive light on two orthogonal modes of same polarization, a demultiplexer configured to divide the two orthogonal modes into a mode carried on a first intermediate waveguide and a mode carried on a second intermediate waveguide independent from the first intermediate waveguide, a polarization multiplexer configured to recombine the modes carried on the intermediate waveguides into two polarization-orthogonal modes carried on one output waveguide.

20 Claims, 9 Drawing Sheets

(51) Int. Cl.
*H04J 14/06* (2006.01)
*G02B 6/12* (2006.01)

(56) References Cited

U.S. PATENT DOCUMENTS

| | | | |
|---|---|---|---|
| 9,588,295 B2* | 3/2017 | Onawa | G02B 6/14 |
| 9,690,044 B2* | 6/2017 | Matsumoto | G02B 6/14 |
| 2014/0270620 A1 | 9/2014 | Anderson et al. | |
| 2014/0314367 A1 | 10/2014 | Kojima et al. | |
| 2016/0062038 A1 | 3/2016 | Oka | |
| 2016/0246009 A1 | 8/2016 | Jiang | |
| 2016/0313505 A1 | 10/2016 | Ma et al. | |

FOREIGN PATENT DOCUMENTS

| | | | |
|---|---|---|---|
| CN | 104122621 A | 10/2014 | |
| CN | 104639259 A | 5/2015 | |
| CN | 105308495 A | 2/2016 | |
| EP | 0536819 A1 | 4/1993 | |
| EP | 0562695 A1 | 9/1993 | |
| EP | 2879250 A1 | 6/2015 | |
| WO | 2016071345 A1 | 5/2016 | |

OTHER PUBLICATIONS

Machine Translation and Abstract of Chinese Publication No. CN102736181, Oct. 17, 2012, 13 pages.
Machine Translation and Abstract of Chinese Publication No. CN104639259, May 20, 2015, 14 pages.
Romero-Garcia, S., et al, "Alignment Tolerant Couplers for Silicon Photonics," IEEE Journal of Selected Topics in Quanturn Electronics, vol. 21, No. 6, Nov./Dec. 2015, 14 pages.
Hatori, N., et al, "A Novel Spot Size Convertor for Hybrid Integrated Light Sources on Photonics-Electronics Convergence System," IEEE, 2012, pp. 171-173.
Mersali, B., et al, "Optical-Mode Transformer: A III-V Circuit Integration Enabler," IEEE Journal of Selected Topics in Quantum Electronics, vol. 3, No. 6, Dec. 1997, pp. 1321-1331.
Foreign Communication From a Counterpart Application, European Application No. 16206810.0, Extended European Search Report dated Jun. 7, 2017, 10 pages.
Foreign Communication From a Counterpart Application, PCT Application No. PCT/CN2017/118149, English Translation of International Search Report dated Mar. 27, 2018, 6 pages.
Foreign Communication From a Counterpart Application, PCT Application No. PCT/CN2017/118149, English Translation of Written Opinion dated Mar. 27, 2018, 4 pages.

* cited by examiner

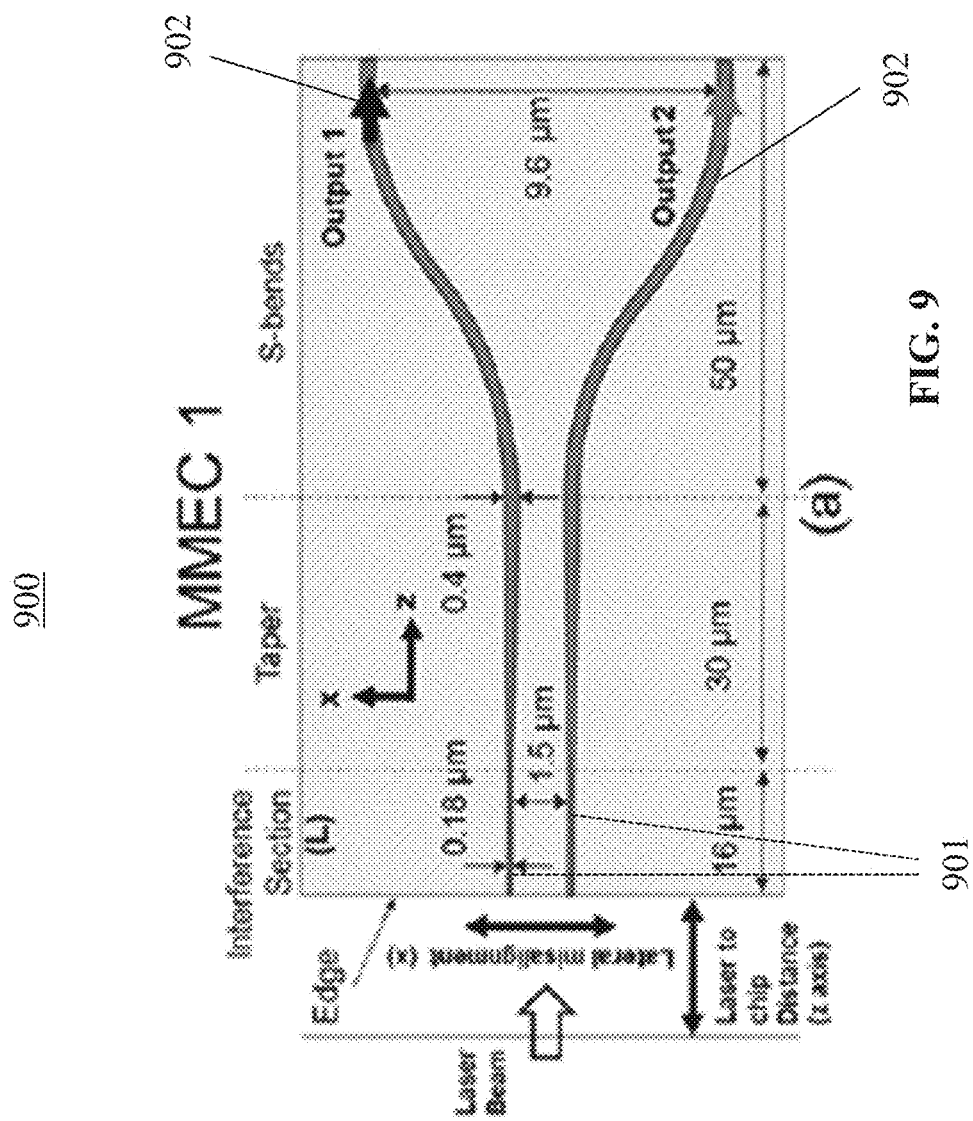

OPTICAL CHIP AND METHOD FOR COUPLING LIGHT

CROSS-REFERENCE TO RELATED APPLICATIONS

This application is a continuation application of Int'l Patent App. No. PCT/CN2017/118149 filed on Dec. 23, 2017, which claims priority to European Patent App. No. EP16206810.0 filed on Dec. 23, 2016, both of which are hereby incorporated by reference in their entireties.

TECHNICAL FIELD

The present disclosure relates to an optical chip and a method for coupling light. In particular, the purpose of the optical chip and method is to optically couple and receive light from an active optical device, such as a laser. The optical chip of the present disclosure is preferably based on silicon photonics technology.

BACKGROUND

Silicon photonics is rapidly gaining importance as generic technology platform for a wide range of applications in telecom, data communications (datacom), interconnect, and sensing. It allows implementing photonic functions through the use of complementary metal-oxide-semiconductor (CMOS) compatible wafer-scale technologies on high quality, low cost silicon substrates, in order to fabricate silicon photonic chips.

Especially for short distance applications like datacom, interconnect, or access networks, chip cost is a major concern. By employing the benefits of silicon mass production, the price of a photonic chip integrating hundreds of basic building blocks can be extremely aggressive. However, due to the fact that silicon is an indirect band gap material, it is difficult to monolithically integrate active components. Therefore, photonic chips and active devices need to be butt-coupled or flip-chip-coupled, which result in expensive packaging. Else, the fabrication process becomes more complex.

One solution to this problem is growing germanium on silicon. While this solution allows fabricating photodetectors and electro-absorption modulators, the fabrication process is quite complex. Further, the fabricated components are not as good as III-V semiconductor components. Furthermore, amplifiers and lasers are still not available with this solution.

As an alternative solution, heterogeneous integration by wafer-bonding has been proposed. While promising results have been obtained with this solution, it nevertheless remains impractical, because of the need of III-V semiconductor processing on silicon wafers.

A third solution uses a transfer technology (e.g. flip-chip or transfer-printing), which allows for high throughput placement of finished devices. As shown in FIG. 7, an active device 701 and a photonic chip 702 can be interfaced using a butt-coupling approach, wherein waveguide facets 703 of the two devices 701, 702 are mechanically placed face-to-face. If the modes of the waveguides 703 respect certain rules, and if alignment is accurate (as shown in FIG. 7, left-hand side), light can flow between the two butt-coupled devices 701, 702 with minimum loss.

This technology potentially reduces the cost of silicon photonics chips even further, while at the same time increasing their performance. There are several reasons for this potential. All III-V semiconductor processing can be done in a dedicated III-V fab, and on wafers with dense arrays of identical devices. Since the devices can be packed closely together, the cost per device can be quite low. Further, wafers can be fully optimized for a device, which is an advantage over monolithic integration. Then, the III-V semiconductor devices can be transferred or bonded onto the silicon photonic platform.

There is, however, one issue with this solution: The alignment accuracy, which can be achieved for this technology with the currently available machines, is limited (i.e. to about $3\sigma<1.5$ micrometers ($\mu$m)). When misaligning the two waveguides 703 (as shown in FIG. 7, right-hand side), insertion loss increases rapidly. That is, in order to be able to use this solution for high performance communication application products, an alignment tolerant interface between the active device 701 and the photonic chip 702 needs to be provided.

Solutions for more alignment tolerant interfaces involve the use of waveguide engineering, particularly in order to enlarge the optical mode both at the active device and the photonic chip facet. A wider mode is intrinsically less sensitive to misalignment than a tight one. However, often a more complex processing—both on the active device side and on the photonic chip side—is required, and significantly increases the chip cost.

As shown in FIG. 8, the so-called trident coupler 800 has been proposed for the photonic chip side, as a way to increase horizontal alignment tolerances without increasing fabrication complexity. The use of the trident coupler 800 allows for a larger optical mode profile on the photonic chip side, and thus indeed for a more tolerant coupling compared to, for instance, an inverted taper coupler. In particular, with the trident coupler 800, light is received, for instance from an active device like a laser, by means of a double-core Si waveguide 801, and is then transferred adiabatically within the trident coupler 800 to a single Si waveguide 802.

To improve the alignment tolerance even further—as shown in FIG. 9—an alternative optical coupler 900 has been proposed. In this version, there is still a double-core waveguide 901 at the edge for receiving light from an active device like a laser. However, the received light is then not recombined adiabatically into one single waveguide, as in the trident coupler 800 of FIG. 8, but remains in two separate output waveguides 902. With this design, a lateral misalignment of e.g. the laser or a fiber relative to the photonic chip 900 is accommodated by a varying phase difference between the two on-chip single mode output waveguides 902, to which the light is transferred. Compared to the trident coupler 800 design of FIG. 8, the alignment tolerances are improved, because it is possible to couple to both to the first order and second order mode of the two core waveguides 901 at the chip edge.

The main drawback of the design of this optical coupler 900 is that the two output waveguides 902 can only be used separately. That is, the power of the two output waveguides 902 cannot be easily recombined into a single channel, due to the phase mismatch between the optical modes of the two output waveguides 902, which depends on the misalignment between the coupled devices.

Recombining the two modes into a single waveguide or channel, for instance an optical fiber, could result in constructive recombination (no loss) or destructive recombination (no transmission)—depending on the phase relation. For most applications, two separate output waveguides 902 are not acceptable, and the solution shown in FIG. 9 can therefore not be used.

SUMMARY

In view of the above-mentioned problems and disadvantages, the present disclosure aims to improve the solutions. The present disclosure has specifically the object to provide a solution for coupling an optical chip to an active device with improved alignment tolerance. At the same time, it should be possible to recombine the power of the light received by the optical chip into a single channel with low loss. In other words, a split of the injected optical power onto two separate output channels is to be avoided. Thus, the aim is to provide a misalignment tolerant coupling design to achieve a low cost assembly that can be used for a wide range of applications.

The object of the present disclosure is achieved by the solution provided in the enclosed independent claims. Advantageous implementations of the present disclosure are further defined in the dependent claims.

The solution of the present disclosure bases in particular on an optical chip including an edge coupler, which is able to receive light on two orthogonal optical modes, which have the same polarization. These modes can, for example, be two modes within a single-tip input waveguide, or two modes within a double-tip input waveguide (e.g. supermodes).

A first aspect of the present disclosure provides an optical chip, comprising an input edge coupler having at least one input waveguide configured to receive light on two orthogonal modes of same polarization, a demultiplexer configured to divide the two orthogonal modes into a mode carried on a first intermediate waveguide and a mode carried on a second intermediate waveguide independent from the first intermediate waveguide, and a polarization multiplexer configured to recombine the modes carried on the intermediate waveguides into two polarization-orthogonal modes carried on one output waveguide.

This optical chip allows recombining the light from the two separate intermediate waveguides into one single channel without additional loss, and independently from the alignment position of the optical chip to an active device, from which the light is received. Thus, the optical chip is suitable for a wide range of applications. Once the light is recombined into the one output waveguide, the full power that was coupled into the optical chip from an active device, like a laser, can be further used, e.g. by coupling it to a standard single-mode fiber.

When recombining the two optical modes of the intermediate waveguides, deconstructive interference is avoided using polarization diversity. To this end, the modes of the two intermediate waveguides are recombined into the output waveguide as two polarization-orthogonal modes, which are e.g. a transverse electric (TE) and a transverse magnetic (TM) mode of a single waveguide. Since the polarizations are orthogonal, there is no power exchange between the two modes, even if the two are coherent. Therefore, the overall power of the two modes is conserved with no loss. The polarization diversity is obtained using the polarization multiplexer.

In a first implementation form of the optical chip according to the first aspect, the input edge coupler has two input waveguides for receiving the light.

In a second implementation form of the optical chip according to the first implementation form of the first aspect, both input waveguides are tapered towards an input facet of the input edge coupler.

Thus, light can be adiabatically coupled into the optical chip with low loss.

In a third implementation form of the optical chip according to the first or second implementation form of the first aspect, the two orthogonal modes of same polarization are an even supermode and an odd supermode of the two input waveguides.

With the two input waveguides, and the use of these supermodes, wide optical mode profiles can be easily obtained improving the alignment tolerance.

In a fourth implementation form of the optical chip according to the first to third implementation forms of the first aspect, the demultiplexer comprises two large radius bends, which separate the two input waveguides having a smaller pitch into the two intermediate waveguides having a larger pitch. The intermediate waveguides have a pitch larger than the pitch between the input waveguides.

Thus, the demultiplexer can be realized with low structural and fabrication complexity.

The double-tip waveguide design of the optical chip, which is described in the first to fourth implementation form, allows building upon the structure shown in FIG. 9. With this double-tip waveguide design, the alignment intolerance with respect to insertion loss can be more than doubled.

In a fifth implementation form of the optical chip according to the first aspect, the input edge coupler has one multimode input waveguide for receiving the light.

In a sixth implementation form of the optical chip according to the fifth implementation form of the first aspect, the two orthogonal modes of same polarization are a fundamental mode and a first order mode of the multimode input waveguide.

In a seventh implementation form of the optical chip according to the fifth or sixth implementation form of the first aspect, the demultiplexer is an optical element configured to convert the first order mode of the multimode waveguide into a fundamental mode of one of the intermediate waveguides.

The single-tip waveguide design of the optical chip, which is described in the fifth to seventh implementation form, achieves a significant improvement of the alignment intolerance with respect to insertion loss. Further, a very simple input edge coupler can be used.

In an eighth implementation form of the optical chip according to the first aspect as such or according to any of the previous implementation forms of the first aspect, the polarization multiplexer is a polarization splitter and rotator (PSR).

A PSR presents a simple, but efficient solution for obtaining the polarization multiplexing, which is used to recombine the optical modes of the intermediate waveguides.

In a ninth implementation form of the optical chip according to the first aspect as such or according to any of the previous implementation forms of the first aspect, the optical chip further comprises passive and/or active optical elements arranged between the input edge coupler and the polarization multiplexer.

The possibility to add active/passive on-chip functionalities is a great advantage, and allows very flexible chip design. Preferably, the number of passive and/or active optical elements is doubled compared to a standard single waveguide input case.

In a tenth implementation form of the optical chip according to the ninth implementation form of the first aspect, the passive and/or active optical elements are configured to independently act on light carried on the first and second intermediate waveguide, respectively.

The light can thus be shaped separately, and differently if desired, before being recombined, which allows for high flexibility when designing the optical chip.

In an eleventh implementation form of the optical chip according to the first aspect as such or according to any of the previous implementation forms of the first aspect, the two polarization orthogonal modes are a fundamental transverse electric mode and a fundamental transverse magnetic mode of the output waveguide.

In a twelfth implementation form of the optical chip according to the first aspect as such or according to any of the previous implementation forms of the first aspect, a polarization-independent output coupler configured to couple the two polarization-orthogonal modes into a fiber.

Thus, the optical power injected into the optical chip can be completely used further.

In a thirteenth implementation form of the optical chip according to the first aspect as such or according to any of the previous implementation forms of the first aspect, the optical chip is configured to optically couple to and receive light from an active optical device, like a laser.

A second aspect of the present disclosure provides a method for coupling light, comprising the steps of receiving light on two orthogonal modes of same polarization with at least one input waveguide, demultiplexing the two orthogonal modes to a mode carried on a first intermediate waveguide and a mode carried on a second intermediate waveguide independent from the first intermediate waveguide, and recombining the modes carried on the intermediate waveguides into two polarization-orthogonal modes carried on one output waveguide.

In a first implementation form of the method according to the second aspect, the light is received with two input waveguides.

In a second implementation form of the method according to the first implementation form of the second aspect, both input waveguides are tapered towards a light input facet.

In a third implementation form of the method according to the first or second implementation form of the second aspect, the two orthogonal modes of same polarization are an even supermode and an odd supermode of the two input waveguides.

In a fourth implementation form of the method according to the first to third implementation forms of the second aspect, the demultiplexing is carried out with two large radius bends, which separate the two input waveguides having a smaller pitch into the two intermediate waveguides having a larger pitch.

In a fifth implementation form of the method according to the second aspect, the light is received with one multimode input waveguide.

In a sixth implementation form of the method according to the fifth implementation form of the second aspect, the two orthogonal modes of same polarization are a fundamental mode and a first order mode of the multimode input waveguide.

In a seventh implementation form of the method according to the fifth or sixth implementation form of the second aspect, the demultiplexing is carried out with an optical element converting the first order mode of the multimode waveguide into a fundamental mode of one of the intermediate waveguides.

In an eighth implementation form of the method according to the second aspect as such or according to any of the previous implementation forms of the second aspect, the recombining is carried out by a PSR.

In a ninth implementation form of the method according to the second aspect as such or according to any of the previous implementation forms of the second aspect, the passive and/or active optical elements act on the light after the demultiplexing.

In a tenth implementation form of the method according to the ninth implementation form of the second aspect, the passive and/or active optical elements act independently on light carried on the first and second intermediate waveguide, respectively.

In an eleventh implementation form of the method according to the second aspect as such or according to any of the previous implementation forms of the second aspect, the two polarization orthogonal modes are a fundamental transverse electric mode and a fundamental transverse magnetic mode of the output waveguide.

In a twelfth implementation form of the method according to the second aspect as such or according to any of the previous implementation forms of the second aspect, the recombined two polarization-orthogonal modes are coupled into a fiber.

In a thirteenth implementation form of the method according to the second aspect as such or according to any of the previous implementation forms of the second aspect, the method is for optically coupling to and receiving light from an active optical device, like a laser.

With the method of the second aspects, the same advantages and effects can be achieved as with the optical chip of the first aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings.

FIGS. 7, 8, and 9 illustrate optical chips and the problem of misalignment for an optical chip.

DETAILED DESCRIPTION OF EMBODIMENTS

Figure 1:
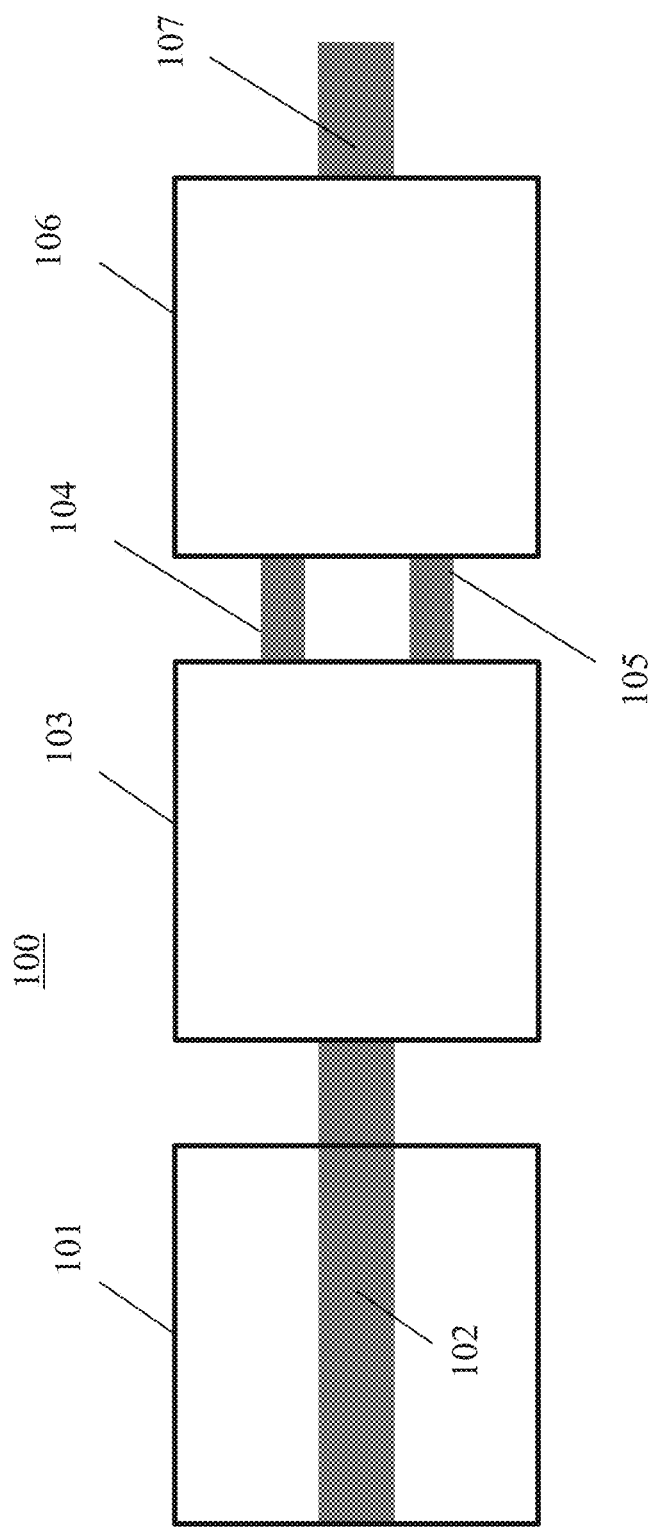
FIG. 1 shows an optical chip according to an embodiment of the present disclosure.

FIG. 1 shows an optical chip 100 according to an embodiment of the present disclosure. The optical chip 100 comprises an input edge coupler 101, a demultiplexer 103 and a polarization multiplexer 106, which are optically connected.

In particular, an input edge coupler 101 has at least one input waveguide 102, which is configured to receive light, preferably from an active device, like a laser, which is butt-coupled to the optical chip 100. The light is advantageously received on two orthogonal modes of same polarization.

The demultiplexer 103 is then further configured to divide the two orthogonal modes into a mode carried on a first intermediate waveguide 104 and a mode carried on a second intermediate waveguide 105, respectively, the second intermediate waveguide 105 being independent from the first intermediate waveguide 104. That is, the two waveguides 104, 105 are not optically coupled.

The polarization multiplexer 106 is preferably a PSR, and is configured to recombine the modes carried on the intermediate waveguides 104, 105 into two polarization-orthogonal modes carried on one output waveguide 107.

That is, the input waveguide 102 on the input facet of the input edge coupler 101 of the optical chip 100 is waveguide engineered, so that this input facet of the input edge coupler 101 supports two optical modes of the same polarization. The two optical modes are then demultiplexed into the two independent intermediate waveguides 104, 105. After demultiplexing the light propagated through the intermediate waveguides 104, 105 in one specific mode, which is for instance a fundamental mode T0, the light carried by the two intermediate waveguides 104, 105 may be processed independently in the optical chip 100. Thus, any passive and/or active functionality may be achieved on-chip. The two intermediate waveguides 104, 105 are subsequently input into the polarization multiplexer 106, which recombines the modes of the two intermediate waveguides 104, 105 into one output waveguide 107. Thus, two polarization orthogonal modes are obtained, which are for instance the TE0 and the fundamental transverse magnetic mode TM0, or any other combination of fundamental modes T0 and higher, especially first order modes T1, as long as they are orthogonal to each other. The two polarization-orthogonal modes may afterwards be coupled to a fiber using, for example, a polarization-independent standard output coupler.

Figure 7:
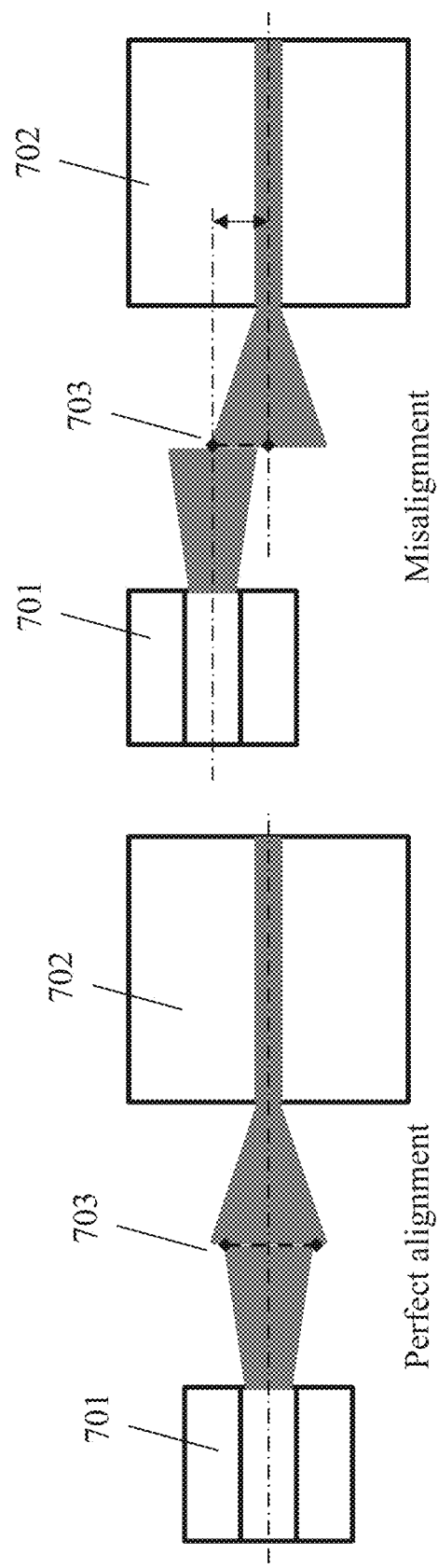
Figure 8:
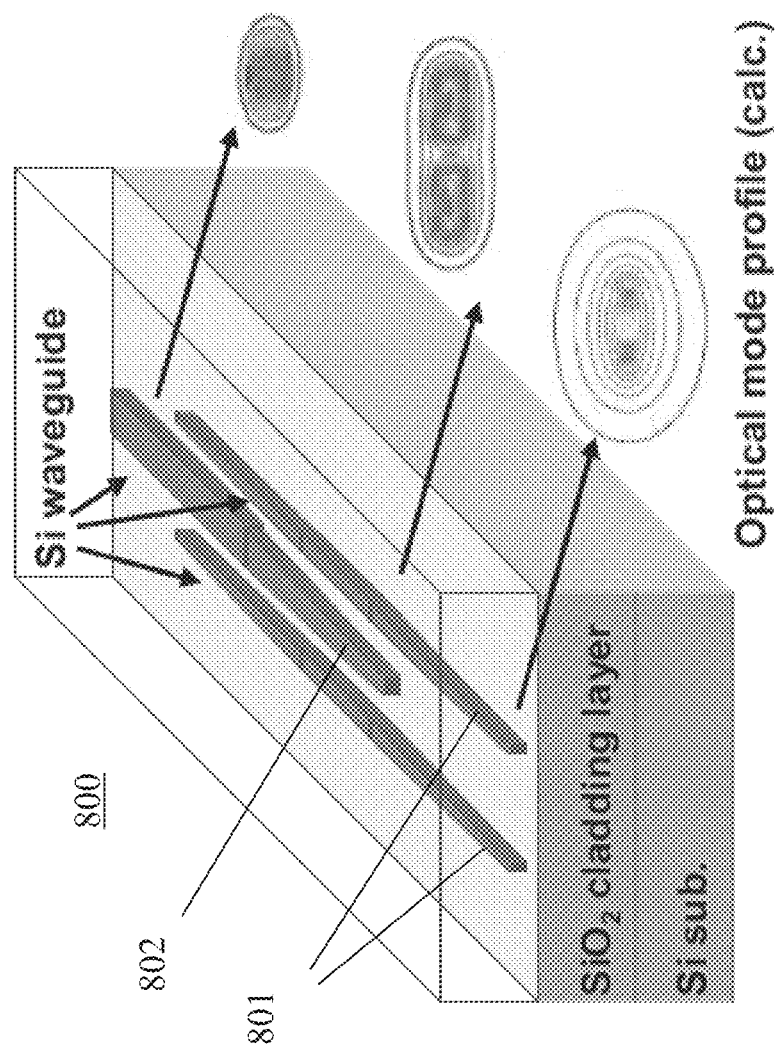

In comparison to the solutions shown, for example, in the FIGS. 7, 8, and 9, the horizontal alignment tolerance can be at least doubled—depending on the specific characteristics of the active device and the optical chip 100. Furthermore, it is much easier to adapt the input of the optical chip 100, for instance, a laser beam, without dedicated fabrication steps.

Figure 2:
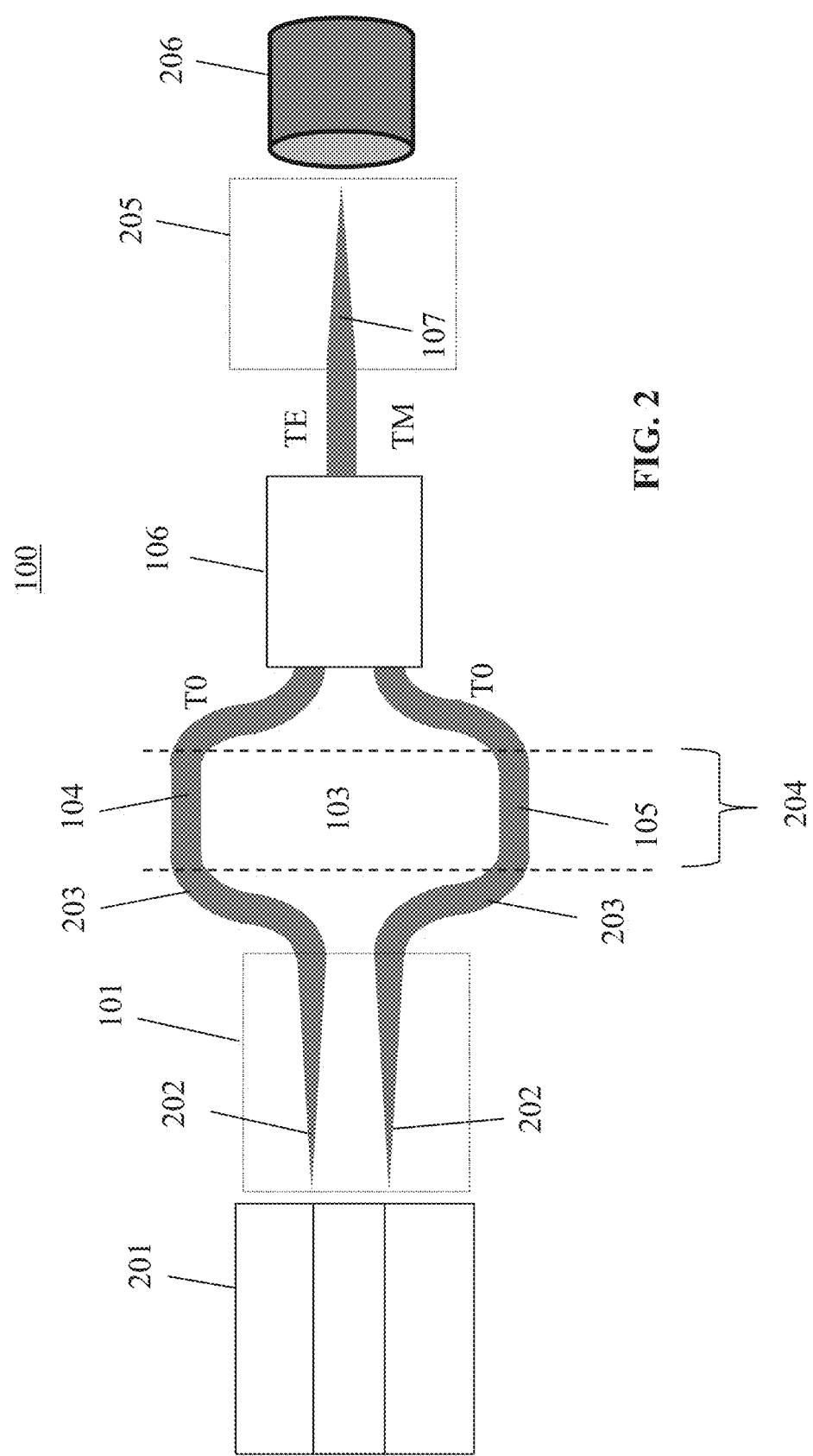
FIG. 2 shows an optical chip according to an embodiment of the present disclosure.

FIG. 2 shows an optical chip 100 according to a specific embodiment of the present disclosure, which bases on the general embodiment shown in FIG. 1. In the optical chip 100 of FIG. 2, the input edge coupler 101 is based on a double-core waveguide. That is, it has two input waveguides 202, which are preferably tapered going toward the input facet of the input edge coupler 101. The width of the waveguide tips, and the pitch between the two input waveguides 202, depend on the material used. Advantageously, a silicon nitride core having a thickness of 330 nm, and silicon oxide top and bottom claddings are used, in order to fabricate the input waveguides 202. At the input facet, the two waveguides 202 have preferably a width of 350nm, and preferably a pitch of 1.4 um. As the waveguides 202 move away from the input facet of the optical chip 100, the width of the two waveguides 202 is preferably increased up to 750 nanometers (nm) over a distance of preferably 100 μm, while the pitch value does preferably not change.

The two input waveguides 202 are then separated using preferably two large radius bends 203, in order to have a final pitch that preferably exceeds 6 μm. Such final pitch values allow the input waveguides 202 to become uncoupled, i.e. two intermediate waveguides 104, 105 are formed, which are independent from each other. Thereby, the demultiplexing is automatically realized.

After the demultiplexing of the two input modes, which are preferably an odd and even supermode of the coupled input waveguides 202, the light propagates in the intermediate waveguides 104, 105, preferably as the fundamental transverse electric mode TE0 of the waveguides. The two intermediate waveguides 104, 105 can now include any kind of passive and/or active optical elements 204, which may independently act on the light that is carried on the respective waveguides 104, 105.

Then, the two intermediate waveguides 104, 105 are multiplexed together using preferably a PSR as an advantageous implementation of the polarization multiplexer 106. In case of the optical chip 100 shown in FIG. 2, since the propagating modes after demultiplexing are preferably TE0 modes, a PSR can be used as polarization multiplexer 106. The mode of one of the two intermediate waveguides 104, 105 becomes preferably a TE mode, more preferably the TE0 mode of the output waveguide 107, while the mode of the other intermediate waveguide 105, 104 becomes preferably a TM mode, more preferably the TM0 mode of the output waveguide 107. From the output waveguide 107, the light can then be coupled further to preferably a fiber 206, for example, through a polarization-independent fiber coupler 205.

Figure 3:
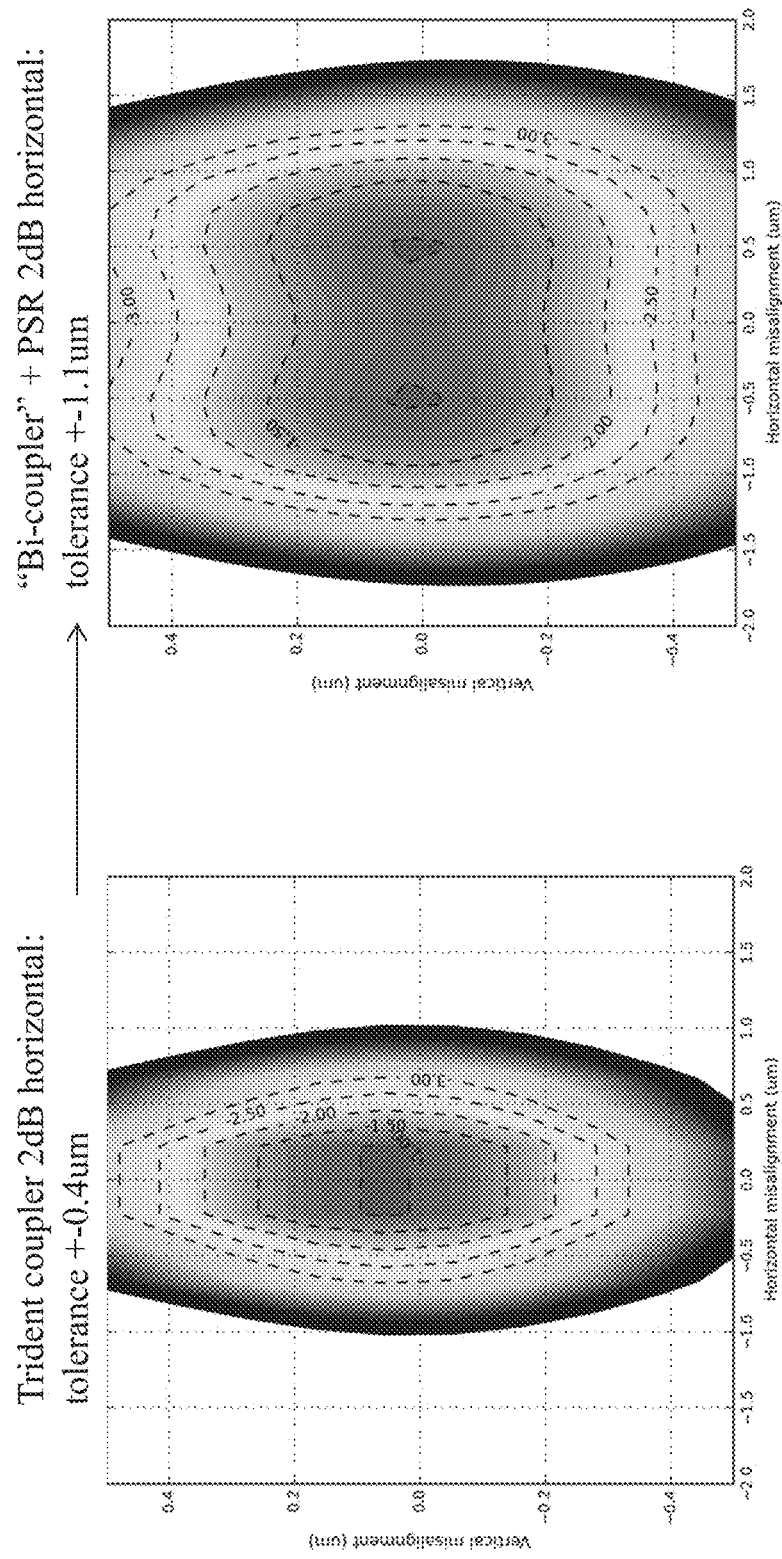
FIG. 3 demonstrates the alignment tolerance of an optical chip according to an embodiment of the present disclosure.

FIG. 3 shows—as grey-scale plot—the insertion loss of the optical chip 100 of FIG. 2 (right-hand side), when used to couple to a standard DFB laser. The insertion loss is compared to that of a traditional trident coupler optimized for the same platform (left-hand side). The insertion losses are respectively shown for horizontal misalignment on the x-axes, and for vertical misalignment on the y-axes. It can be seen that the insertion loss of the trident coupler reaches high levels (black areas) already for smaller values of the horizontal misalignment. In fact, the horizontal alignment tolerance is more than doubled for the optical chip 100 of FIG. 2 compared to the trident coupler.

Figure 4:
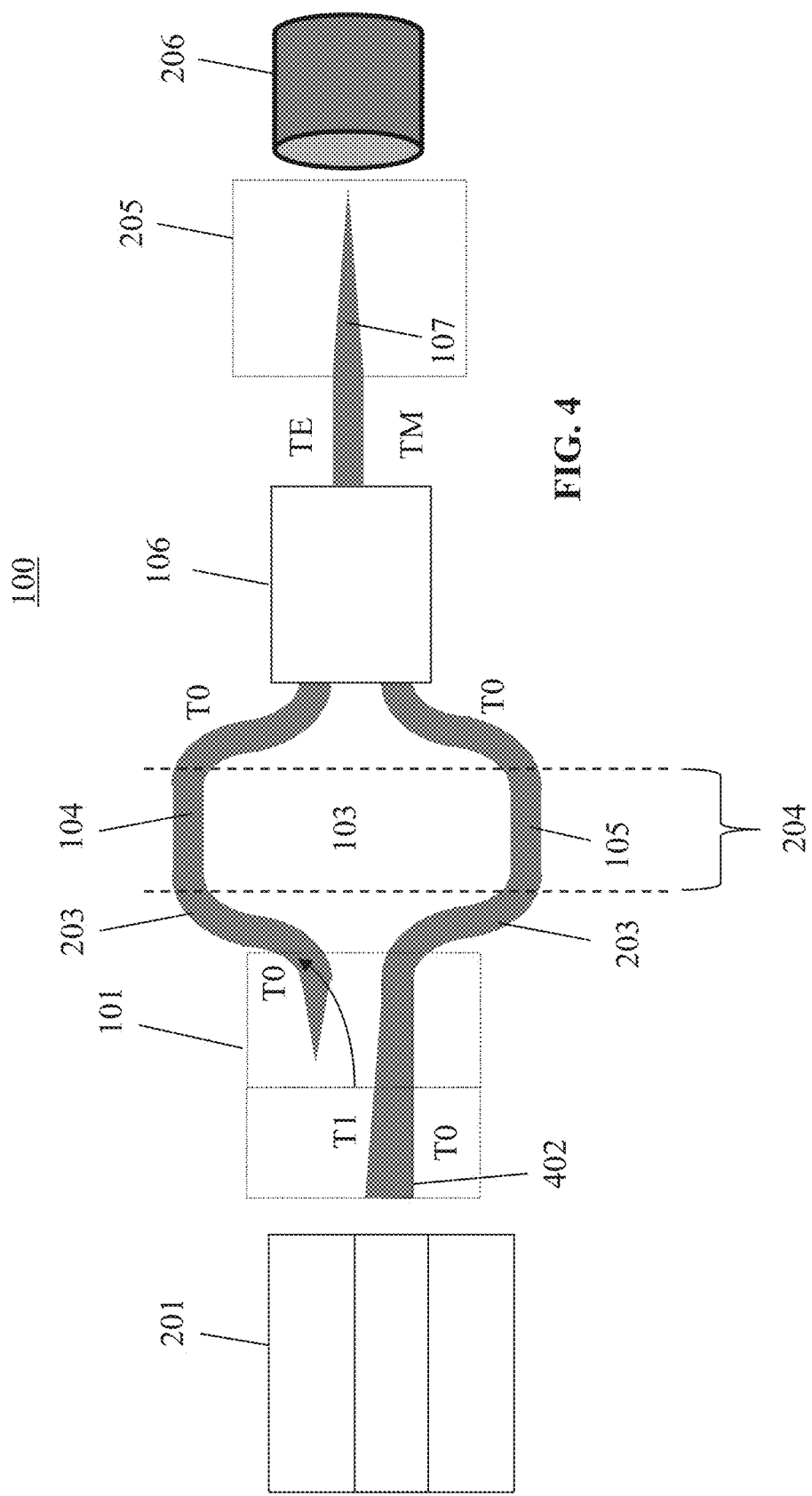
FIG. 4 shows an optical chip according to an embodiment of the present disclosure.

FIG. 4 shows another optical chip 100 according to a specific embodiment of the present disclosure, which bases on the general embodiment shown in FIG. 1. Differently from the optical chip 100 shown in FIG. 2, the input edge coupler 101 of the optical chip 100 of FIG. 4 is based on a multimode single-core waveguide. That is, it has one multimode input waveguide 402. Preferably, the multimode input waveguide 402 is a silicon nitride waveguide, and preferably has a thickness of 230 nm, and preferably a width of 2.8 μm. The light received from the active device 201 is now preferably coupled to a T0 and T1 mode, more preferably to the TE0 and the first order transverse electric mode TE1 of the multimode waveguide 402. Then, for instance, the TE1 mode is demultiplexed using a TE1-to-TE0 demultiplexer 103. This may be realized with a demultiplexer, which can be designed in several known ways. The rest of the optical chip 100 of FIG. 4 is identical to the optical chip 100 shown in FIG. 2.

Figure 5:
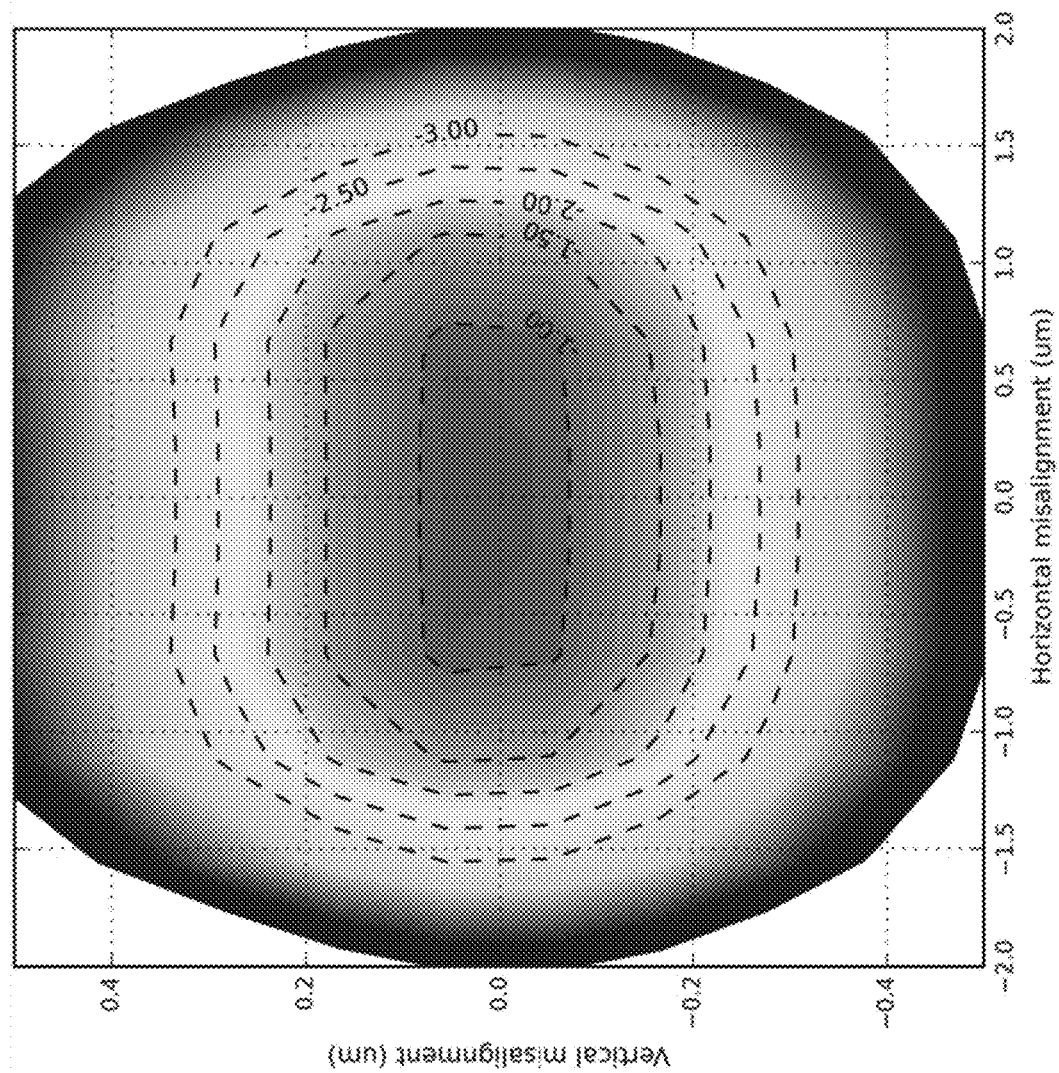
FIG. 5 demonstrates the alignment tolerance of an optical chip according to an embodiment of the present disclosure.

FIG. 5 shows (similar to FIG. 3 as grey-scale plot) the insertion loss of the optical chip 100 of FIG. 4 depending on horizontal misalignment (x-axis) and vertical misalignment (y-axis). Compared to the insertion loss of a trident coupler (as shown in FIG. 3, left-hand side), a much larger alignment tolerance can be achieved using this optical chip 100 of FIG. 4.

Figure 6:
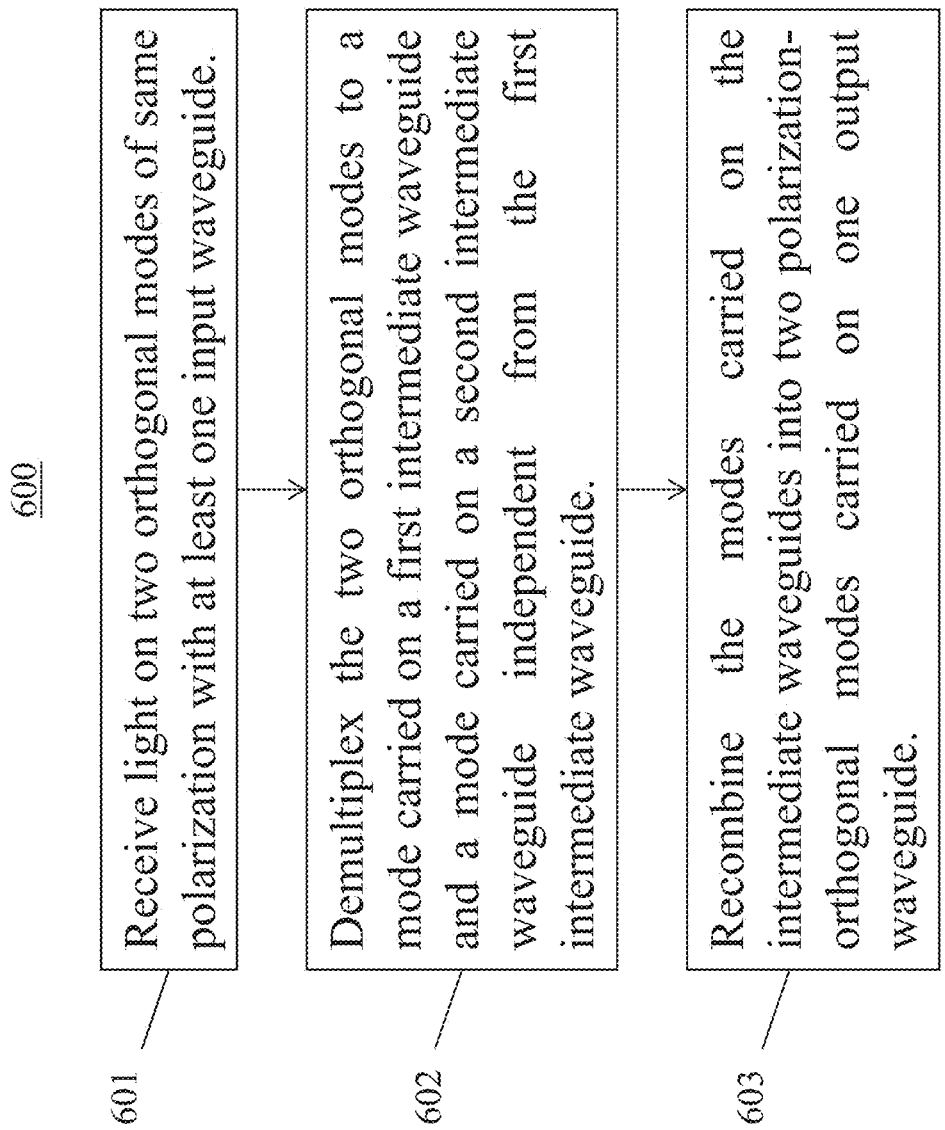
FIG. 6 shows a method according to an embodiment of the present disclosure.

FIG. 6 shows a method 600 for coupling light according to an embodiment of the present disclosure. The method 600 comprises a first step 601 of receiving light on two orthogonal modes of same polarization with at least one input waveguide 102, 202, 402. Further, it comprises a second step 602 of demultiplexing the two orthogonal modes to a mode carried on a first intermediate waveguide 104 and a mode carried on a second intermediate waveguide 105 independent from the first intermediate waveguide 104. Finally, the method 600 comprises a third step 603 of recombining the modes carried on the intermediate waveguides 104, 105 into two polarization-orthogonal modes carried on one output waveguide 107.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An optical chip comprising:
    an input edge coupler having at least one input waveguide configured to receive light on two orthogonal modes of a common polarization;
    a demultiplexer configured to divide the two orthogonal modes into a mode carried on a first intermediate waveguide and a mode carried on a second intermediate waveguide independent from the first intermediate waveguide; and
    a polarization multiplexer configured to recombine the mode carried on the first intermediate waveguide and the mode carried on the second intermediate waveguide into two polarization-orthogonal modes carried on one output waveguide.

2. The optical chip according to claim 1, wherein the input edge coupler comprises two input waveguides to receive the light.

3. The optical chip according to claim 2, wherein the two input waveguides are each tapered towards an input facet of the input edge coupler.

4. The optical chip according to claim 2, wherein the two orthogonal modes of the common polarization comprise an even supermode of the two input waveguides and an odd supermode of the two input waveguides.

5. The optical chip according to claim 2, wherein the demultiplexer comprises two large radius bends, wherein the two large radius bends separate the two input waveguides having a smaller pitch into the first intermediate waveguide having a larger pitch and the second intermediate waveguide having a larger pitch.

6. The optical chip according to claim 1, wherein the input edge coupler comprises a multimode input waveguide to receive the light.

7. The optical chip according to claim 6, wherein the two orthogonal modes of the common polarization comprise a fundamental mode of the multimode input waveguide and a first order mode of the multimode input waveguide.

8. The optical chip according to claim 7, wherein the demultiplexer is an optical element configured to convert the first order mode of the multimode input waveguide into a fundamental mode of the first intermediate waveguide.

9. The optical chip according to claim 7, wherein the demultiplexer is an optical element configured to convert the first order mode of the multimode input waveguide into a fundamental mode of the second intermediate waveguide.

10. The optical chip according to claim 1, wherein the polarization multiplexer is a polarization splitter and rotator (PSR).

11. The optical chip according to claim 1, further comprising passive optical elements arranged between the input edge coupler and the polarization multiplexer.

12. The optical chip according to claim 11, wherein the passive optical elements are configured to independently act on light carried on the first intermediate waveguide.

13. The optical chip according to claim 1, further comprising active optical elements arranged between the input edge coupler and the polarization multiplexer.

14. The optical chip according to claim 13, wherein the active optical elements are configured to independently act on light carried on the second intermediate waveguide.

15. The optical chip according to claim 1, wherein the two polarization-orthogonal modes comprise a fundamental transverse electric mode (TE) of the output waveguide and a fundamental transverse magnetic mode (TM) of the output waveguide.

16. The optical chip according to claim 1, further comprising a polarization-independent output coupler configured to couple the two polarization-orthogonal modes into a fiber.

17. The optical chip according to claim 1, wherein the optical chip is configured to optically couple to an active optical device and receive light from the active optical device.

18. The optical chip according to claim 17, wherein the active optical device is a laser.

19. A method for coupling light comprising:
    receiving light on two orthogonal modes of a common polarization with at least one input waveguide;
    demultiplexing the two orthogonal modes into a mode carried on a first intermediate waveguide and a mode carried on a second intermediate waveguide independent from the first intermediate waveguide; and
    recombining the mode carried on the first intermediate waveguide and the mode carried on the second intermediate waveguide into two polarization-orthogonal modes carried on one output waveguide.

20. The method according to claim 19, further comprising coupling the two polarization-orthogonal modes into a fiber.

* * * * *